United States Patent [19]

Cowan

[11] Patent Number: 4,599,181

[45] Date of Patent: Jul. 8, 1986

[54] HUMIC SUBSTANCES WITH ENHANCED SURFACE CHARGE

[75] Inventor: Jack C. Cowan, Lafayette, La.

[73] Assignee: Venture Chemicals, Inc., Lafayette, La.

[21] Appl. No.: 705,283

[22] Filed: Feb. 25, 1985

[51] Int. Cl.[4] ............................................... C09K 7/02
[52] U.S. Cl. ............................ 252/8.5 C; 252/8.5 P; 562/475
[58] Field of Search ............ 252/8.5 A, 8.5 C, 8.5 P; 562/475, 408; 71/24

[56] References Cited

U.S. PATENT DOCUMENTS

| | | | |
|---|---|---|---|
| 2,650,197 | 8/1953 | Rahn | 252/8.5 |
| 2,813,827 | 11/1957 | Crowley et al. | 252/8.5 |
| 2,881,211 | 4/1959 | Sperry | 252/8.5 |
| 3,079,335 | 2/1963 | Clem et al. | 252/8.5 |
| 3,932,166 | 1/1976 | Vignovich et al. | 562/475 X |
| 4,319,041 | 3/1982 | Goff | 562/475 |
| 4,404,107 | 9/1983 | Cowan et al. | 252/8.5 |

Primary Examiner—Herbert B. Guynn
Attorney, Agent, or Firm—Roy F. House

[57] ABSTRACT

The electronegative surface charge of humic acid-containing materials is increased by treating the humic acid-containing material with anhydrous hydrochloric acid. The humic acid-containing material of enhanced surface charge is an effective viscosity reducing additive for water base drilling fluids and other aqueous suspensions of solids.

20 Claims, No Drawings

HUMIC SUBSTANCES WITH ENHANCED SURFACE CHARGE

BACKGROUND OF THE INVENTION

1. Field

One aspect of this invention relates to humic acid-containing materials having an enhanced electronegative surface charge. Another aspect of this invention relates to the use of humic acid-containing materials having an enhanced surface charge to decrease the viscosity of aqueous, clay-containing drilling fluids.

2. Prior Art

Humus, organic matter which is more or less decomposed anerobically, is formed on the floors of forests from decomposed leaves and other detritus, in soils, on the bottom of ponds and lakes from organic matter grown or deposited therein; it occurs in peat bags, in lignite and brown coal deposits and many other types of minerals and soils, such as Leonardite, Aguja, and titanium mineral deposits. When any of these materials is treated with alkali, an organic fraction called humic substance dissolves. If the resulting solution is acidified to pH 2 to 3, some of the organic matter precipitates; this material is called humic acid, and the portion which remains in solution are called fulvic acid and ulmic acid. The exact structures of humic acids are unknown, and they are extremely variable. The principal organic groups present are phenolic and carboxylic OH, aliphatic CH, carbonyl, conjugated carbonyl or aromatic $CH_2$ or $CH_3$ or ionic carboxyl, and possible others. The average molecular weight of the humic acids is between 5,000 and 50,000. They have no X-ray or electron diffraction patterns and are therefore presumable amorphous. Humic acids have a large cation exchange capacity which varies from about 200 to about 500 milliequivalents per 100 grams at pH 7 depending on the humus source. Humic acids are colloids. When the cation exchange sites on the humic molecule are filled predominantly with other than hydrogen, the material is called humate. The humates of monovalent inorganic and ammonium ions are soluble or colloidally dispersable in water, but the humates of multivalent cations are insoluble.

Humic acid is also obtained by the controlled oxidation of coal. See for example Schulz et al. U.S. Pat. No. 4,305,728, column 2, lines 6–51, incorporated herein be reference.

The use of humic acid-containing materials and humates in aqueous base, clay-containing drilling fluids or "muds" to decrease the viscosity and gel strength or decrease the fluid loss is well known, as exemplified by the following U.S. Pat. Nos.: Lawton et al. 1,999,766; Wayne 2,334,051; Rahn 2,650,197; Wilson 2,782,163; Chisholm 3,009,874; Stuchell et al. 3,027,322; Firth 4,311,600. Also various derivatives of humic acid or humic acid-containing materials have also been disclosed for this use in drilling fluids as exemplified by the following U.S. Pat. Nos.: Crowley et al. 2,813,826 and 2,813,827; Monroe 3,034,982 and 3,039,958; Moschopedis 3,352,902 and 3,700,728.

Humic acid may be extracted from humic acid-containing materials in a relatively pure, concentrated form for further use. Representative U.S. patents which disclose various processes for extracting humic acid from its source material are: Burdick U.S. Pat. No. 2,992,093; Karchet U.S. Pat. Nos. 3,111,404 and 3,544,296; Schwartz et al. U.S. Pat. No. 3,398,186; Chambers et al. U.S. Pat. No. 3,770,411; Goff U.S. Pat. No. 4,319,041; Moran et al. U.S. Pat. No. 4,459,149.

Funk U.S. Pat. No. 4,416,666 discloses aqueous deashed coal slurries containing a high concentration of coal and having a low viscosity wherein the colloidal sized coal particles have a zeta potential from about 15.4 to about 70.2 millivolts, preferably a negative surface charge from about $-15.4$ to about $-70.2$ millivolts. The surface charge is obtained by the addition of dispersing agents ot the coal slurry, preferably anionic dispersants.

SUMMARY OF THE INVENTION

I have discovered that the electronegative surface charge of humic acid-containing materials is increased by reacting the humic acid-containing material with anhydrous hydrochloric acid. I have further discovered that this humic acid-containing material of enhanced surface charge is an effective additive to stabilize and decrease the viscosity of aqueous base, solids containing drilling fluids. Furthermore, I have found that this humic acid-containing material of enhanced surface charge can be reacted with organic ammonium cations to produce organophilic humic acid derivatives which are useful as fluid loss additives in invert oil emulsion drilling fluids.

Thus, the invention comprises a method of enhancing the electronegative surface charge of a humic acid-containing material which comprises reacting the humic acid-containing material with anhydrous hydrochloric acid.

The invention also comprises a method of reducing the viscosity of a water base, solids-containing drilling fluid which comprises adding to the drilling fluid a viscosity reducing amount of a humic acid-containing material whose surface charge has been enhanced by reaction with anhydrous hydrochloric acid.

The invention further comprises an aqueous drilling fluid having a pH of at least 8 containing clay solids and a viscosity decreasing amount of a humic acid-containing material whose electronegative surface charge has been enhanced by reaction with anhydrous hydrochloric acid.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The methods can comprise, consist essentially of, or consist of the stated steps with the stated materials.

The terms "drilling fluids", "drilling muds", and "muds" as used herein refer to well known aqueous suspensions of solids employed in a rotary well drilling process to provide several valuable properties essential to the process including cooling the drill bit, removing the cuttings from the borehole, stabilizing the sides of the borehole, and overcoming the pore pressures of the formations penetrated.

All percentages (%) of humic acids as used hereinafter refer to the percent by weight of humic acid based on the moisture-free humic acid-containing material, dried at 105° C., unless otherwise indicated.

DETAILED DESCRIPTION OF THE INVENTION

The humic acid-containing materials, hereinafter sometimes referred to as HACM for brevity, which are useful in the practice of this invention are those common sources of humic materials which contain at least 50% humic acid, as measured by the percentage of HACM which is soluble in aqueous sodium hydroxide solution at a concentration of 5% HACM and at a pH of 10. Preferably the HACM contains from about 50% to about 80% humic acid. The richest common source of HACM are coals of the type known as lignite, Leonardite, or brown coal, synthetically oxidized coals, and humates associated with titanium mineral deposits. The preferred humic acid-containing material is any coal which meets the specifications for the class designates as Class IV, Lignitic, ASTM Designation D388-38, Classification of Coals by Rank.

The humic acid can be extracted from the HACM for use in the present invention. However for economic reasons, it is preferred to utilize the HACM without removing any of the components thereof except moisture, if necessary.

Reaction of anhydrous hydrochloric acid gas with the HACM produces a HACM having an enhanced electronegative surface charge. The reaction must be conducted such that the anhydrous hydrochloric acid gas intimately contacts the HACM in order for the reaction to occur. This may be accomplished using any of the known equipment for conducting solid-gas reactions such as fluidized bed reactor, rotating driers, etc. The reaction temperature should be at least 30° C., preferably at least 50° C. The reaction is exothermic and these temperatures are easily achieved by admitting the anhydrous hydrochloric acid gas to the reactor containing the HACM at a rate sufficient to achieve these temperatures. Generally the temperature should be maintained less than about 100° C. Preferably the maximum temperature will be about 80° C. External heat or cooling may be applied to the reactor to achieve a reaction temperature within these ranges.

The amount of anhydrous hydrochloric acid gas should be from about 1% to about 10%, based on the weight of moisture free HACM, preferably from about 2% to about 7.5%.

The moisture content of the HACM will generally range from about 0% to about 35% by weight, preferably from about 5% to about 30% by weight.

The humic acid-containing material of enhanced electronegative surface charge is useful as an additive for reducing the viscosity and fluid loss of alkaline solids-containing drilling fluids, particularly alkaline clay-containing drilling fluids.

Water-based drilling fluids or muds are well-known aqueous suspension compositions, commonly referred to as "drilling muds" or more simply as "muds". Depending on the salinity of the water phase, they may be further described as "fresh water muds" or "salt water muds". The suspended solids portions of the muds are commonly comprised of clays, weight materials, shale, sand, and various other impurities and additives. Hydrophilic chemicals, both solid and liquid may be added to adjust and control viscosity, gelation, lubrication, filtration, corrosion, contamination, water loss, etc. Portions of oils such as petroleum distillates may be added to form emulsions. Desirably, to promote pumpability and flow characteristics, the viscosity of the mud is held to a minimum, without obviating the gel strength of the mud. Viscosity reduction or "thinning" can occur by reducing the apparent viscosity, the yield point, the rate and degree of gelation or all three of these factors. In the present invention, viscosity is reduced by the addition of the humic acid-containing material of enhanced surface charge prepared by reacting a HACM with anyhydrous hydrochloric acid. Many of the known water-based drilling muds may be advantageously treated by utilization of this invention.

This method of the invention is accomplished by dispersing a viscosity reducing amount of the HACM of enhanced surface charge in a water base drilling mud. Dispersion can be carried out employing conventional mixing and agitating equipment. The amount of HACM of enhanced surface charge may vary over wide proportions depending on the degree of viscosity reduction desired. Generally from about 0.1 pounds per 42 gallon barrel (ppb.) to about 20 ppb. is sufficient, preferably from about 0.5 ppb. to about 10 ppb.

The following example describes the manner and process for making and using the invention and sets forth the best mode contemplated by the inventor of carrying out the invention but is not to be construed as limiting. The physical test data presented was obtained using procedures specified by API (American Petroleum Institute) RP 13B, "Standard Procedure for Testing Drilling Fluids".

EXAMPLE

Five hundred grams of −100 mesh lignite containing 15% moisture are placed in a glass vessel adapted to be heated and rotated. The lignite is heated to about 65° C. and the vessel evacuated utilizing a vacuum pump. Thereafter anhydrous hydrochloric acid (AHA) is admitted while continuously rotating the vessel. The amount of AHA was 3% based on the weight of anhydrous moisture-free lignite. The reaction was allowed to proceed for 30 minutes. Thereafter the treated lignite was cooled to room temperature for evaluation.

The treated lignite and a sample of the original untreated lignite were evaluated as viscosity reducing additives in a water base mud containing 35 ppb. Wyoming bentonite. The pH of the mud was adjusted to 8.5 before testing. The data obtained are given in Table 1. The data indicate that the lignite treated with anhydrous hydrochloric acid was about twice as efficient as the un-modified lignite in reducing the viscosity of this drilling clay dispersion.

The zeta potential of the un-treated lignite and the anhydrous hydrochloric acid-treated lignite were obtained as function of pH by titrating a 0.1% by weight suspension in water of each with a 5N solution of sodium hydroxide. After each increment addition of sodium hydroxide the pH and the zeta potential were measured. The zeta potential was measured utilizing a Laser Zee instrument manufactured by Pen Kem, Inc. using the following procedure:

1. Fill the test chamber with the suspension under investigation and place the chamber in the instrument.
2. Turn on the laser beam, focus on stationary layer and examine particles. They will vibrate due to Brownian motion.
3. Apply 150 volts; particles will move to the right towards the anode, if negative, and to the left towards the cathode, if positive.

4. Turn the zeta potential knob until the particles seem to be stopped.
5. Read the zeta potential.
6. Repeat several times and take an average.

The data obtained are given in Table B. The data indicate that the treatment with anhydrous hydrochloric acid significantly increased the electronegative surface charge of the lignite.

TABLE A

| Sample | ppb. Sample | % Reduction Apparent Viscosity | Yield Point |
| --- | --- | --- | --- |
| Lignite | 0.5 | 40 | 50 |
| Lignite | 1.0 | 57 | 75 |
| Lignite | 2.0 | 67 | 90 |
| Lignite | 5.0 | 73 | 100 |
| Treated Lignite, Example 1 | 0.25 | 37 | 45 |
| Treated Lignite, Example 1 | 0.5 | 53 | 70 |
| Treated Lignite, Example 1 | 1.0 | 67 | 90 |
| Treated Lignite, Example 1 | 2.0 | 73 | 100 |

TABLE B

| Sample | pH | Zeta Potential, mv. |
| --- | --- | --- |
| Lignite | 8.4 | −22.2 |
| Lignite | 9.5 | −29.0 |
| Lignite | 10.5 | −30.2 |
| Lignite | 11.5 | −24.1 |
| Lignite | 12.2 | −32.5 |
| Treated Lignite, Example 1 | 7.0 | −21.7 |
| Treated Lignite, Example 1 | 8.3 | −24.3 |
| Treated Lignite, Example 1 | 9.2 | −29.9 |
| Treated Lignite, Example 1 | 10.3 | −32.3 |
| Treated Lignite, Example 1 | 11.5 | −35.4 |
| Treated Lignite, Example 1 | 12.0 | −31.1 |

I claim:

1. A method of enhancing the electronegative surface charge of a humic acid-containing material which comprises reacting said humic acid-containing material which has a moisture content from about 0% to about 35% by weight and which contains at least 50% humic acid as measured by the percentage of said humic acid-containing material which is soluble in aqueous sodium hydroxide at a concentration of 5% of said humic acid-containing material and at a pH of 10 with anhydrous hydrochloric acid at a temperature in the range from about 30° C. to about 100° C., wherein the amount of said anhydrous hydrochloric acid is from about 1% to about 10% by weight of said humic acid-containing material.

2. The method of claim 1 wherein said reaction is conducted at a temperature in the range from about 50° C. to about 80° C.

3. The method of claim 1 wherein the amount of anhydrous hydrochloric acid is in the range from about 2% to about 7.5%, and wherein the temperature is in the range from about 50° C. to about 80° C.

4. The method of claim 1 wherein said humic acid-containing material is selected from the group consisting of lignite, peat, Leonardite, brown coal, oxidized coal, humates associated with titanium mineral deposits, and mixtures thereof.

5. The method of claim 4 wherein said reaction is conducted at a temperature in the range from about 50° C. to about 80° C.

6. The method of claim 4 wherein the amount of anhydrous hydrochloric acid is in the range from about 2% to about 7.5%, and wherein the temperature is in the range from about 50° C. to about 80° C.

7. The method of claim 1 wherein said humic acid-containing material is a coal which meets the specifications for the class designated as Class IV, Lignitic, ASTM Designation D388-38, Classification of Coals by Rank.

8. The method of claim 7 wherein said reaction is conducted at a temperature in the range from about 50° C. to about 80° C.

9. The method of claim 7 wherein said reaction is conducted at a temperature in the range from about 50° C. to about 80° C., and wherein the amount of hydrochloric acid is in the range from about 2% to about 7.5%.

10. The method of claim 1 wherein said humic acid-containing material has a moisture content from about 5% to about 30% by weight.

11. The humic acid-containing material of enhanced surface charge prepared by the method of claim 1.

12. The humic acid-containing material of enhanced surface charge prepared by the method of claim 4.

13. The humic acid-containing material of enhanced surface charge prepared by the method of claim 7.

14. The humic acid-containing material of enhanced surface charge prepared by the method of claim 10.

15. A method of reducing the viscosity of a water-based drilling mud which comprises adding to said drilling mud a viscosity reducing amount of a humic acid-containing material whose electronegative surface charge has been enhanced by the method of claim 1.

16. The method of claim 15 wherein said humic acid-containing material is selected from the group consisting of lignite, peat, Leonardite, brown coal, oxidized coal, humates associated with titanium mineral deposits, and mixtures thereof.

17. The method of claim 15 wherein said humic acid-containing material is a coal which meets the specifications for the class designated as Class IV, Lignitic, ASTM Designation D388-38, Classification of Coals by Rank.

18. An aqueous drilling fluid having a pH of at least 8 containing clay solids and a viscosity decreasing amount of a humic acid-containing material whose electronegative surface charge has been enhanced by the method of claim 1.

19. The drilling fluid of claim 18 wherein said humic acid-containing material is selected from the group consisting of lignite, peat, Leonardite, brown coal, oxidized coal, humates associated with titanium mineral deposits, and mixtures thereof.

20. The drilling fluid of claim 18 wherein said humic acid-containing material is a coal which meets the specifications for the class designated as Class IV, Lignitic, ASTM Designation D388-38, Classification of Coals by Rank.

* * * * *